Patented Nov. 18, 1930

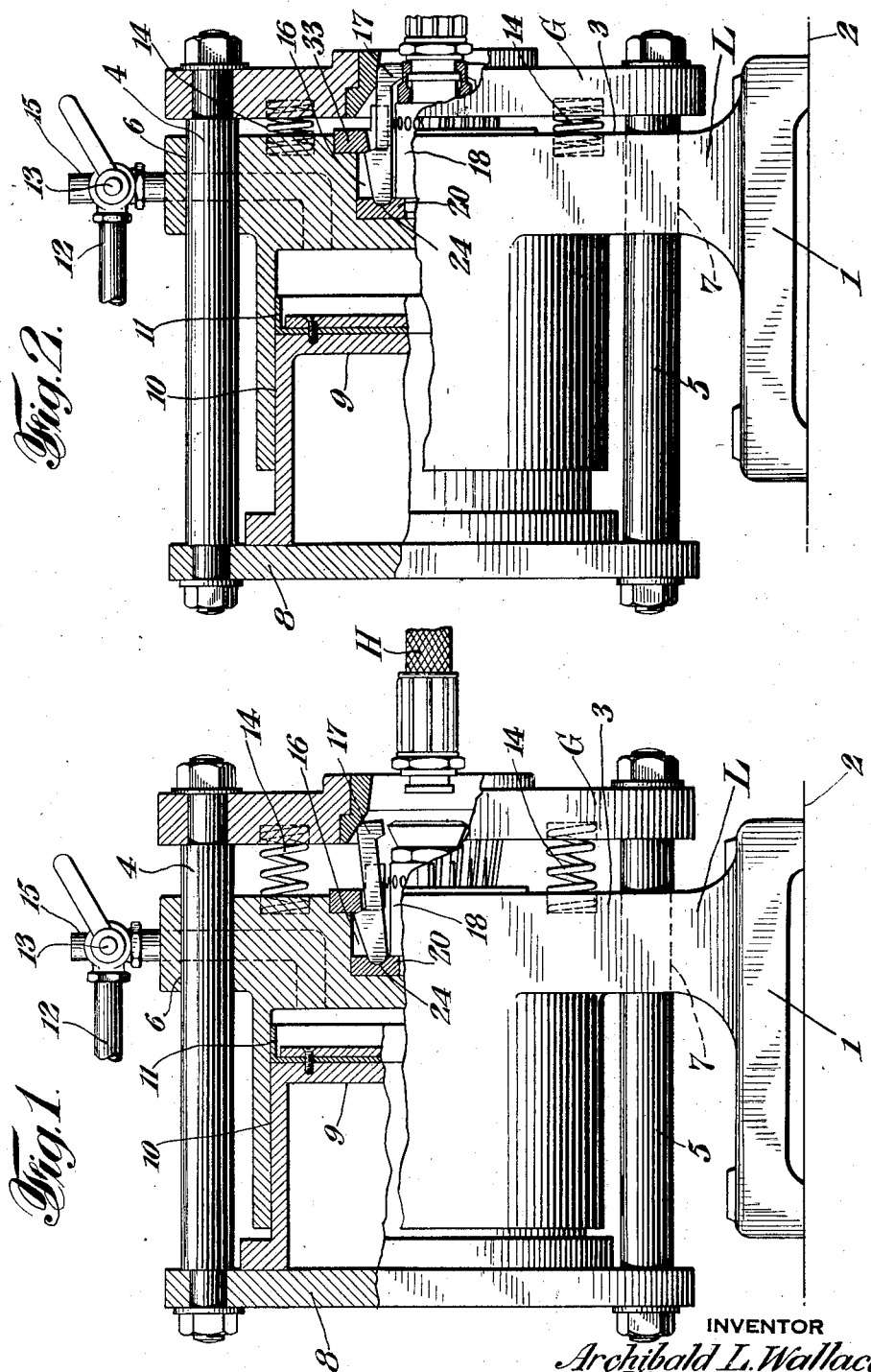

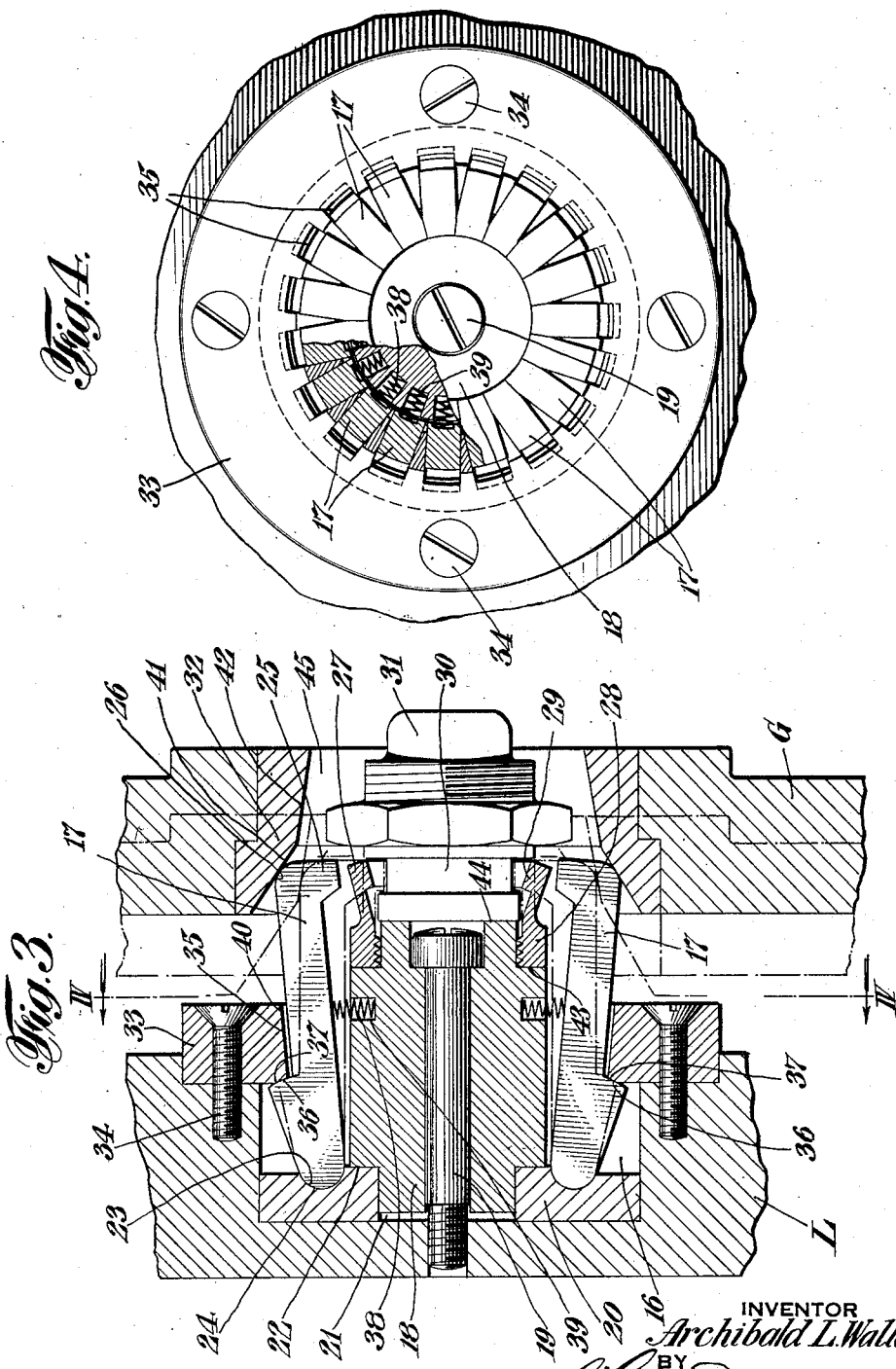

1,782,219

UNITED STATES PATENT OFFICE

ARCHIBALD L. WALLACE, OF BROOKLYN, NEW YORK, ASSIGNOR TO METAL HOSE & TUBING CO., INC., OF BROOKLYN, NEW YORK, A CORPORATION OF NEW YORK

MACHINE FOR USE IN ASSEMBLING HOSE-COUPLING PARTS AND THE LIKE

Application filed November 24, 1928. Serial No. 321,693.

This invention relates to a machine for use in assembling hose coupling parts and the like, and an object of the invention is to provide a machine which is simple, practical and efficient and which includes parts adapted for quickly and easily squeezing inwardly simultaneously from all radial directions an annular sleeve portion of a coupling or the like to thereby assemble the coupling parts.

A more specific object is to provide a machine by which to reduce by compression from all radial directions the diameter of an annular sleeve portion of one member of a two-part coupling so that an annular rib of said member which is normally of such diameter to permit easy assembly of the two coupling parts will be condensed and reduced in diameter to engage within an annular groove of the second coupling member in a manner to provide swivel connection between the coupling members.

A further specific object is to provide a machine so constructed as to comprise means for receiving and supporting the two coupling members in registering relation to each other, a multiplicity of presser members positioned side by side surrounding the coupling part to be squeezed, means to hold the presser members normally yieldingly out of engagement with the coupling member, and means readily controllable for forcefully applying the presser members against the coupling.

A further specific object is to provide a machine including two parts movable with respect to each other, one part carrying the mechanism for engaging the coupling member, the other part carrying means effective by relative movement of the two parts for operating said mechanism, and to so design these parts that coupling members may be easily and conveniently placed into and removed from position to be operated upon by said mechanism.

A further object is to provide simple and efficient means by which to manually control at will the movements of the two relatively movable mentioned parts of the machine.

Other objects and aims of the invention, more or less specific than those referred to above, will be in part obvious and in part pointed out in the course of the following description of the elements, combinations, arrangements of parts and applications of principles constituting the invention; and the scope of protection contemplated will be indicated in the appended claims.

In the accompanying drawings which are to be taken as a part of this specification, and in which I have shown merely a preferred form of embodiment of the invention:—

Fig. 1 is a side elevational view of a machine constructed in accordance with this invention, a portion being broken away and illustrated in vertical section, and the parts being shown "open", that is as they appear when the machine is at rest, one hose coupling member being positioned therein preparatory to receiving the other hose coupling member.

Fig. 2 is a view similar to that seen in Fig. 1 but showing the parts "closed", that is as they appear with both hose coupling members in position and with the presser members fully squeezed together, the two coupling members having been now permanently joined.

Fig. 3 is an enlarged vertical sectional view showing the presser members and related parts, the mechanism being shown in "open" position by full lines and in "closed" position by dotted lines, and Fig. 4 is a front elevational view of the presser members and their carrying parts, a portion being broken away and shown in section substantially as upon the plane of line IV—IV of Fig. 3.

Referring to the drawings for describing in detail the structure therein illustrated, the reference character L indicates one of the relatively movable members of the machine while the reference character G indicates the other relatively movable member of the machine. While it will be seen that it is immaterial which of these members actually moves and which is stationary, the member L is for convenience shown as being a stationary member and the member G a movable member. The member L is provided with a carrying bracket or base 1 by which it may be attached to any suitable support or platform 2.

The member G is arranged parallel with the front face as 3 of member L and carries a pair of guide rods as 4 and 5 which are mounted slidably within bearing openings as 6 and 7 provided through the member L so that the member G is movable toward and away from the member L but is always held in proper alignment during such movement. At their rear ends the rods 4 and 5 carry a connecting plate 8 upon the forward face of which is supported a plunger 9 slidably engaging within a cylinder 10 formed to receive it upon the rear side of the member L. The plunger may be fitted with any form of gasket or other sealing device as 11, and a source of compressed air may be fed into the cylinder by means of a pipe 12 in which is arranged a manually operable valve 13 by which air under pressure may be introduced into the cylinder at will for forcing the plunger outwardly and hence for forcing the member G toward the member L.

One or more springs as 14—14 may be arranged at convenient points between the members L and G for normally urging them apart, and an outlet as 15 may be provided upon the valve 13 whereby the air pressure within the cylinder may be relieved to the atmosphere.

It will be understood that while the fluid controlled mechanism just described for producing relative movement of the members L and G is considered desirable for the purpose, nevertheless any other mechanism may be employed for this purpose if preferred.

Centrally of its forward face the member L is hollowed out to provide a recess 16 for receiving the presser members 17—17. Centrally of the recess is arranged a cylindrical stud 18 about which the presser members are arranged equi-distant as clearly indicated in Fig. 4. The stud 18 may be formed as an integral part of the member L if desired but it is preferably formed separately from said member and connected thereto by means of a clamp bolt 19 extending longitudinally therethrough and engaging within a threaded aperture in the base of the recess 16 whereby it in turn is adapted to serve as a clamp member for a wear or thrust plate 20 lying against the base of the recess having a central opening 21 through which the screw 19 and a surrounding portion of stud 18 projects. An annular shoulder 22 of the stud overlies the forward face of the thrust plate to hold it firmly in position.

The presser members 17—17 are all of identical shape and size. Each consists of an elongated steel body arranged longitudinally of the stud 18 having one end projecting rearwardly into the recess 16 and the other end projecting forwardly out of said recess. The rear end as 23 is rounded and is received within a correspondingly rounded thrust bearing seat 24 formed for the purpose in the thrust plate 20. The forward end projects beyond the end of the stud 18 and is shaped to provide a nose portion 25 projecting inwardly at its inner face and a cam surface 26 on its outer face.

The nose 25 is intended to directly engage against the "work" that is, in the instance illustrated, against the outer edge of the outflaring annular sleeve portion as 27 of the coupling member 28 for squeezing this sleeve portion into true cylindrical form with the internal rib as 29 on said portion engaging within the annular groove 30 which is provided to receive it upon the mating coupling member 31, and the cam 26 is intended to be engaged by a cam 32 which is carried by the member G for forcing the nose against the "work" as the member G moves toward the member L.

Any appropriate means may be provided for retaining the presser members assembled with their rear ends engaging within the seats 24 but for this purpose the drawing illustrates a retaining ring 33 fixed to the forward face of member L as by means of clamp screws 34. This ring has a series of notches as 35—35 provided in its inner annular edge one for receiving each of the presser members, and each of the presser members is formed with a forwardly facing arcuate shoulder as 36 concentric with the centre of the curvature of the rear end of the presser member, and arranged to have rubbing engagement with a rearwardly facing edge surface part 37 of the ring.

As a convenient means for holding the presser members normally spread outwardly to facilitate the introduction of "work" between them the drawing illustrates a series of small coil springs as 38—38 one for each presser member, being arranged in pockets as 39 of the stud 18 and exerting a constant pressure against the inwardly facing surface of the respective presser member. The outer end walls as 40 of the notches 35 serve as stops to limit the outward movement of the presser members under pressure from these springs.

The cam 32 on member G is in the form of an annular ring in concentric alignment with the stud 18 at all times. It is carried rigidly upon the member G to move therewith toward and away from the member L and its surface which engages the cam portions 26 of the presser members is annular so that it has simultaneous camming action against all of the presser members as the member G moves. Preferably this surface is formed relatively "steep" at one part as at 41 and relatively "shallow" at another part as at 42. The "steep" part 41 is arranged to engage the presser members when the member G is relatively far from the member L, while the "shallow" part 42 is intended to engage the presser members as the member G moves closer to the member L. The purpose of this arrangement is to enable a wide spread of the presser members collectively with relatively short movement of the member G and a corresponding rapid return movement of the presser members into engagement with the "work", while the part 42 is designed to impart a more gradual and a more powerful pressure against the presser members after the presser members have come into engagement with the "work", as will be readily understood from an inspection of the drawings.

It will be seen from this disclosure that the mechanism is simple and compact, that it provides highly efficient means for contracting and condensing the material of the sleeve portion 27 of the coupling member 28 for at once strengthening said portion and causing it to permanently interengage with the other coupling member.

The presser members 17 constitute collectively what may be conveniently termed a coupling assembling means surrounding the stud 18 and movable with respect thereto for performing their function of assembling the coupling parts.

In operation it is simply necessary to introduce a coupling member 28 into position between the presser members, being conveniently supported in said position by being received in an annular seat as 43 provided for the purpose at the forward end of the stud 18. After the member 28 has been thus positioned the mating coupling member is introduced, being conveniently located by contact against the forward end surface as 44 of the stud 18. Then the air pressure is admitted to cylinder 10 for moving the member G and thereby squeezing the presser members together and forcing the rib 29 of the member 28 into the groove 30.

It is particularly noted that the central opening as 45 through the cam 32 affords ample and convenient access to the presser members for inserting and removing the coupling parts.

In practice it is customary to have the coupling part 31 carried upon a section of hose as H which serves as a hand grip by which the member 31 may be conveniently manipulated to place it into the member 28 and to remove it after the member 28 has been attached.

As many changes could be made in this construction without departing from the scope of the invention as defined in the following claims, it is intended that all matter contained in the above description, or shown in the accompanying drawings, shall be interpreted as illustrative only and not in a limiting sense.

Having thus described my invention, what I claim as new and desire to secure by Letters Patent is:—

1. A machine for assembling coupling parts where one annular coupling part is intended to be connected to another by constriction of the diameter of the first coupling part, said machine comprising means to support the first coupling part, a plurality of presser members arranged side by side in position to surround said first coupling part movable toward a common centre for pressing against said coupling part to constrict its diameter, means by which said presser members are pivotally supported to swing toward and away from said common centre, resilient means urging said presser members away from said common centre, and a single ring shaped cam engaging all of said presser members for simultaneously moving them in opposition to said resilient means.

2. A machine for assembling coupling parts where one annular coupling part is intended to be connected to another by constriction of the diameter of the first coupling part, said machine comprising means to support the first coupling part, a plurality of presser members arranged side by side in position to surround said first coupling part movable toward a common centre for pressing against said coupling part to constrict its diameter, means by which said presser members are pivotally supported to swing toward and away from said common centre, resilient means urging said presser members away from said common centre, a clamp ring surrounding said presser members serving to hold them in co-operative engagement with their pivotal support and constituting means to limit the outward movement of said presser members by said resilient means, and means operable simultaneously to move all of said presser members in opposition to the resilient means.

3. A machine by which to assemble coupling parts, said machine comprising two members one of which is movable with respect to the other, means for moving the movable member, one of said members having a stud projecting from its face toward the other member, said stud having a portion shaped to receive and support one of the coupling parts, said stud having a different portion adapted to be engaged by another coupling part to facilitate positioning of the second coupling part with respect to the first, coupling assembling means surrounding the stud movable with respect to the stud for effecting assembly of the two coupling members, and the cam carried by the second member for engaging and operating the assembling means when the movable member is moved.

4. A machine by which to assemble coupling parts, said machine comprising means to define the position of the coupling parts, a plurality of presser members arranged side by side in circular disposition movable toward a common centre for affecting assembly of the coupling parts, means by which the presser members are pivotally supported to swing toward and away from said common centre comprising two separate members one of which constitutes a thrust bearing with which the end edge surfaces of the presser members engage and the other of which comprises a ring collectively surrounding the presser members intermediate the length of the presser members and spaced from the first member, the presser members having shoulders thereon facing away from the first member arranged to rub against the first member, and a cam device to operate said presser members arranged to exert endwise pressure against the presser members in the direction of said thrust bearings.

In testimony whereof I affix my signature.

ARCHIBALD L. WALLACE.